June 3, 1958     H. B. VINCENT     2,837,235
LAMINATED JOINT FOR CATHODE-RAY TUBE ENVELOPE
AND METHOD OF SEALING
Filed March 5, 1957
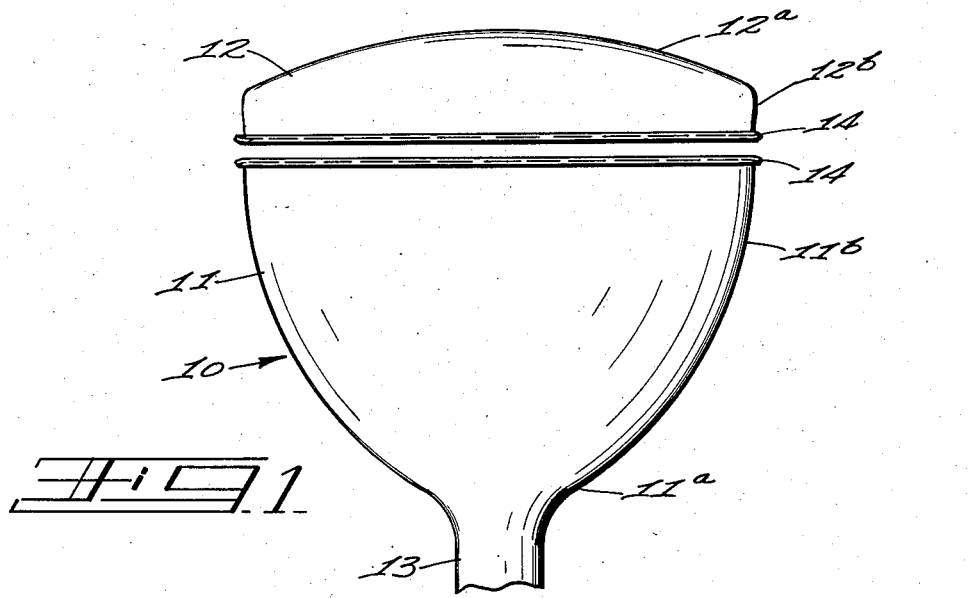
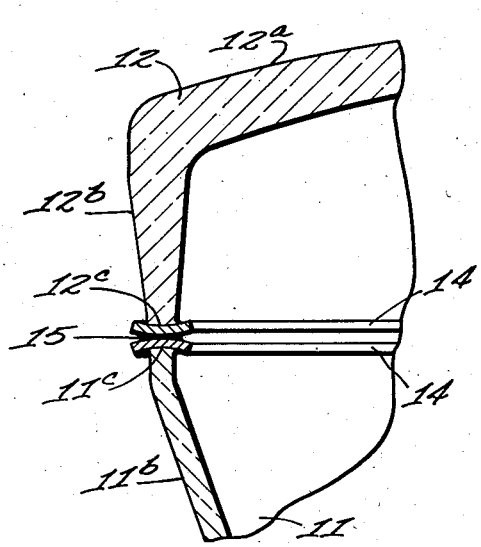
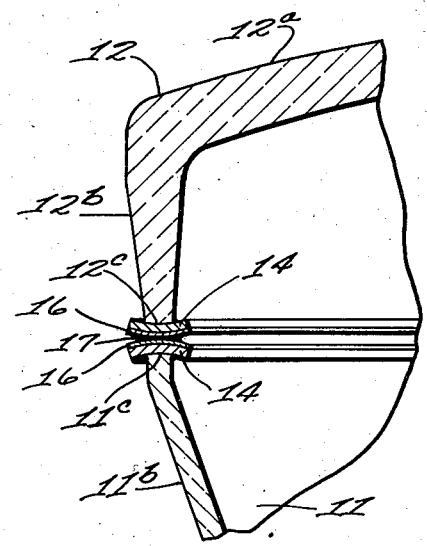
INVENTOR
HARVARD B. VINCENT
BY W. A. SCHAICH &
LEONARD D. SOUBIER
ATTORNEYS

United States Patent Office 2,837,235
Patented June 3, 1958

2,837,235

LAMINATED JOINT FOR CATHODE-RAY TUBE ENVELOPE AND METHOD OF SEALING

Harvard B. Vincent, Toledo, Ohio, assignor to Owens-Illinois Glass Company, a corporation of Ohio Application March 5, 1957, Serial No. 644,076

14 Claims. (Cl. 220—2.3)

The present invention relates to an improved joint for uniting prefabricated hollow glass parts with metal bands to form a hermetically sealed envelope for use as a cathode-ray television picture tube and to the method of producing such joint.

In the manufacture of vacuumized glass envelopes such as electron discharge tubes containing heat-sensitive elements which may be easily damaged by overheating, the problem of joining preformed glass parts cannot be conveniently accomplished by direct fusion of the glass. Heretofore, it has been proposed that annular metallic bands be attached to complemental sealing surfaces of large individual glass parts, and a single layer of low-melting sealant be fusedly interposed between the metallic surfaces to obtain a sealed vacuum-tight joint. However, this method of sealing has previously resulted in a joint which is not sufficiently hermetically durable for the life of the tube to maintain the required high tube vacuum. The sealant has been required to closely match the thermal properties of the metal bands within very strict limits to achieve the required permanent adherence thereto. Another particularly objectionable disadvantage in utilizing a single sealing layer is that the metallic sealing surfaces must be shaped into matching contour to uniformly distribute the compressive loading thereon to insure that the single layer is not dangerously stressed. Even so, a partial loss in tube vacuum has been shown to occur chiefly due to leakage at the interface between metal and sealant, which area is highly susceptible thereto, thus causing tube failure.

Therefore, it is an object of this invention to provide a durable vacuum-tight joint for an essentially glass envelope comprised of a plurality of preformed hollow glass parts having complemental metallic sealing surfaces, which joint may be effected at relatively low temperatures with less critical matching between the primary sealant and the metallic sealing surfaces.

Another object of the present invention is to provide a separable glass and metal envelope for a cathode-ray picture tube which may be sealed into hermetically assembled relationship at metallic sealing surfaces with the establishment of thermally-graded glass-like laminations between metallic sealing surfaces.

Another object of this invention is to provide an improved method of forming a hermetic seal between complemental metallic sealing surfaces united to extensive annular edges of preformed hollow glass parts by interposing a lamination of several glass-like sealing compositions having differing thermal properties between the sealing surfaces, the primary lower-melting sealant being maintained out of contact with the metallic sealing surfaces.

Still another object of this invention is to provide an improved joint for permanently uniting the face plate and funnel members of a cathode-ray tube envelope at their sealing surfaces, to which are attached annular metal rings, by fusedly interposing layers of at least two different glass-like compositions between the metallic sealing surfaces, the higher-melting contacting both metallic sealing surfaces and the lower-melting interposed therebetween.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

On the accompanying drawings:

Fig. 1 is an elevational view of a cathode-ray tube envelope showing the component parts embodying the present invention in disassembled relationship.

Fig. 2 is a fragmentary vertical sectional view of one portion of Fig. 1, showing the seal area of the tube envelope in joined relationship in accordance with known practice.

Fig. 3 is a view similar to Fig. 2, illustrating the principles of the present invention.

While this invention will be described as specifically applied to the manufacture of a cathode-ray tube, it will be apparent to those skilled in the art that the principles of the invention are equally applicable to the manufacture of any type of evacuated glass envelope formed by assembly of two or more preformed glass parts.

A preferred embodiment of this invention consists of a cathode-ray tube envelope 10 comprised of a glass funnel 11, glass face plate 12, and neck 13 which is normally sealed at its extremity by one or more beam guns (not shown). Funnel 11 is frusto-conical in shape with its small end 11a sealed to neck 13 and its large end 11b terminating in an annular sealing surface 11c sealed to face plate 12. Face plate 12 consists of concave-convex viewing panel 12a bounded by a depending annular side panel or flange 12b which terminates in an annular sealing surface 12c.

The overall shape of the glass envelope 10 may be circular or rectangular as conventionally known in the art with sealing surfaces 11c and 12c being reasonably, although not absolutely, planar. Sealing surfaces 11c and 12c may be prepared in any known manner in the molding of the parts or by subsequent shaping to provide reasonably flat complemental surfaces, although extensive grinding and polishing thereof are unnecessary in practicing this invention.

Annular metallic rings or bands 14 are attached to each of the sealing surfaces 11c and 12c and are fully coextensive therewith. Each of the metal bands 14 has an arcuate cross-section with its concave surface fusedly attached to the glass of sealing surfaces 11c and 12c, either by direct glass-to-metal fusion or by utilizing an intermediate sealing material.

As is well nnown, certain internal electronic elements of the tube such as the phosphor screen (not shown), which is deposited on the interior surface of viewing panel 12a or located adjacent thereto, or the beam guns are readily subject to heat damage at elevated temperatures. Hence, it is highly desirable to effect sealing of the face plate and funnel members of the tube envelope at temperatures that are not in excess of those employed in the conventional bake-out operation which is required for all or part of the internal electronic components. Furthermore, in the event of color television, it may be an additional requirement that the face plate and funnel portions of the tube be readily separable to facilitate adjustment and alignment of relatively large internal elements such as an aperture mask or line grid located adjacent to the viewing area. This requirement represents a further disadvantage of sealing techniques heretofore employed which have embodied fusion of at least one portion of the glass parts or of a single layer 15 of sealing composition interposed between metal sealing bands 14 (Fig. 2).

In accordance with the present invention as shown on Fig. 3, each of the annular metal bands 14 has a thin annular layer 16 of vitreous sealing material adhered to its exposed sealing surface. Each layer 16 consists of a glazing of a high-melting glass and, preferably, one comparable to the base glass of the parent glass members 11 and 12. Where layer 16 consists of a high-melting glass similar to the glass parts, glass-to-metal matching of thermal properties is more easily achieved. Metal bands 14 may be first coated over their convex sealing surfaces with the high-melting glass prior to their attachment to the glass parts. The bands are then attached to the annular sealing surfaces 11c and 12c with thin layers 16 exposed. The gasketing layers 16 are then shaped into near-planar matching configuration, such as by abrasive grinding. The grinding operation should be conducted so as not to expose any of the supporting metal of bands 14.

Another annular layer 17 of a low-melting glass sealing composition or solder glass is adhered to one or both of the sealing layers 16, and the parts contacted in desired alignment. The glass and metal parts are then hermetically sealed by thermally fusing layer 17 of low-melting glass sealing composition interposed between layers 16. Layer 17 has a softening point temperature not in excess of 1000° F. and is capable of permanently bonding with glass layers 16. Layer 17 may be fused either with normal atmospheric pressure existing within the envelope, or during evacuation of the envelope in final tube processing. Layers 16, being comprised of glass, are readily shaped into matching configuration and facilitate the adherence of the low-melting glass-like sealant thereto. Low melting layer 17 is of essentially uniform thickness throughout the sealing area, while layers 16 are relatively non-uniform, being ground to attain matching surfaces.

An alternate procedure of forming the joint consists of attaching annular metal bands 14 to each of the sealing surfaces 11c and 12c prior to adherence of glass layers 16 and 17. The thin layers 16 of high-melting glass are then applied to the exposed metallic sealing faces of the bands. With the parts in disassembled relationship, the glass of layer 16 is applied to each part in powder form retained by a suitable vehicle, for example, and then heat-softened to flow out uniformly over the annular exposed surfaces. After gasketing layers 16 are shaped into near-planar agreement, layer 17 of low-melting glass is adhered to one or both of layers 16 over a central portion thereof out of contact with the metal. When the parts are arranged in contacting juxtaposition with the interior working elements installed, layer 17 is thermally softened sufficiently to hermetically seal the joint. This is similarly accomplished at a sealing temperature preferably not in excess of 1000° F.

The selected sealing composition comprising layer 17 is one having chemical and physical properties which are in agreement with high-melting layers 16.

The joint may be readily disassembled as desired by thermally softening sealing layer 17 and disassembling the parts. During such heat-softening, gasketing layers 16 remain firmly attached and undistorted upon metal bands 14 for reassembling of the parts. The parts may then be rejoined by a supplemental application of low-melting sealing composition extending annularly between the parts.

The subject joint has indicated an ability to retain a high tube vacuum over more extensive periods of time than heretofore attainable. Tubes sealed by closure of the bulb by application of the low-melting solder glass to the parent glass surfaces have shown no evidence of leakage after about 3000 hours of test. Also, grinding of the glazing layers to provide an adequate fit between face plate and funnel members is more economical than the present practice of grinding the metal rings.

Various modifications may be resorted to within the spirit and scope of the appended claims.

I claim:

1. An envelope for a hermetically sealed cathode-ray tube comprising prefabricated hollow glass funnel and face plate members having complemental annular sealing edges in juxtaposed relationship, annular metallic bands attached to each of said sealing edges to provide annular metallic sealing surfaces, thin gasketing layers of high-melting glass comparable to the base glass of said glass parts adhered to the juxtaposed sealing surfaces of said metallic bands, and an intermediate annular layer of low-melting glass sealing composition interposed between said gasketing layers of high-melting glass.

2. An envelope for a hermetically sealed cathode-ray tube in accordance with claim 1, said gasketing layers of high-melting glass having thermal properties compatible to bonding with both said metallic bands and said low-melting glass sealing compositions.

3. An envelope for a hermetically sealed cathode-ray tube in accordance with claim 1, said low-melting glass sealing composition having a softening point temperature below 1000° F. for durably joining said glass and metal parts into a vacuum-tight annular joint without deformation of said glass or metal parts.

4. An envelope for a hermetically sealed cathode-ray tube in accordance with claim 1, said intermediate layer of low-melting glass sealing composition being in contact only with the thin annular gasketing layers of high-melting glass.

5. An envelope for a hermetically sealed cathode-ray tube in accordance with claim 1, said annular metallic bands having similar arcuate cross-sections arranged with their convex surfaces in adjacent opposing relationship, the laminations of high- and low-melting glass sealing compositions being fusedly interposed between near-tangential portions of said convex surfaces.

6. An envelope for a hermetically sealed cathode-ray tube in accordance with claim 1, said gasketing layers of high-melting glass comprising thin vitreous sealing surfaces of near-parallel matching configuration, said intermediate layer of low-melting glass sealing composition disposed therebetween being of relatively uniform thickness.

7. An envelope for a hermetically sealed cathode-ray tube comprising a glass funnel part and a glass face plate part respectively provided with complemental juxtaposed annular sealing edges, annular metallic bands attached to each of said sealing edges to provide similar metallic sealing surfaces, thin gasketing layers of high-melting glass similar to the base glass of said glass parts adhered to the juxaposed sealing surfaces of said metallic bands, and an intermediate annular layer of low-melting glass sealing composition interposed between said gasketing layers of high-melting glass, said high-melting glass having thermal properties compatible to bonding with said metallic bands and said low-melting sealing composition, the latter being capable of permanently uniting said parts at a sealing temperature not in excess of 1000° F.

8. The method of forming a hermetic seal between complemental annular sealing surfaces of preformed rigid hollow glass and annular metallic parts comprising the steps of adhering a thin annular layer of high-melting glass to at least one of the sealing surfaces of each annular metallic part having the same general configuration as the glass sealing surfaces, attaching the annular metallic parts to each of said glass sealing surfaces leaving the thin layers of high-melting glass exposed, interposing an annular layer of a low-melting glass sealing composition between the high-melting glass layers, contacting the parts in juxtaposition and hermetically uniting said glass and metal parts by thermally fusing said low-melting glass sealing composition.

9. The method set forth in claim 8, including the step of uniting said glass and metal parts by thermally fusing said low-melting glass sealing composition at a sealing temperature not in excess of 1000° F.

10. The method set forth in claim 8, including the step of grinding the thin layers of high-melting glass on said metallic bands into substantially matching contour after attachment of said bands to said glass parts.

11. The method set forth in claim 8, including the step of thermally fusing said thin layers of high-melting glass having physical properties comparable to the base glass of said hollow glass parts to two of said annular metallic sealing surfaces.

12. The method set forth in claim 8, including the step of hermetically uniting said glass and metal parts by heating said low-melting glass sealing composition to a sealing temperature not in excess of 1000° F. while evacuating said glass and metal envelope.

13. The method of forming a hermetic seal between complemental annular sealing surfaces of preformed hollow glass parts to constitute a cathode-ray tube envelope comprising the steps of attaching annular metallic bands to each of said sealing surfaces, adhering a thin layer of high-melting glass comparable to the base glass of said hollow glass parts to the juxtaposed sealing surfaces of each of said metallic bands, interposing an annular layer of a low-melting glass sealing composition between said high-melting glass layers, and contacting and hermetically uniting said glass and metal parts by thermally fusing said low-melting glass sealing composition.

14. The method set forth in claim 13, including the step of abrasively grinding the adhered thin layers of high-melting glass on said metallic bands into substantially matching contour after their adherence to said glass parts and prior to interposing said low-melting glass sealing composition.

References Cited in the file of this patent

UNITED STATES PATENTS

| | | |
|---|---|---|
| 2,629,093 | Pask | Feb. 17, 1953 |
| 2,643,020 | Dalton | June 23, 1953 |
| 2,690,518 | Flyer | Sept. 28, 1954 |
| 2,752,532 | Dussaussoy | June 26, 1956 |